Figure 1:
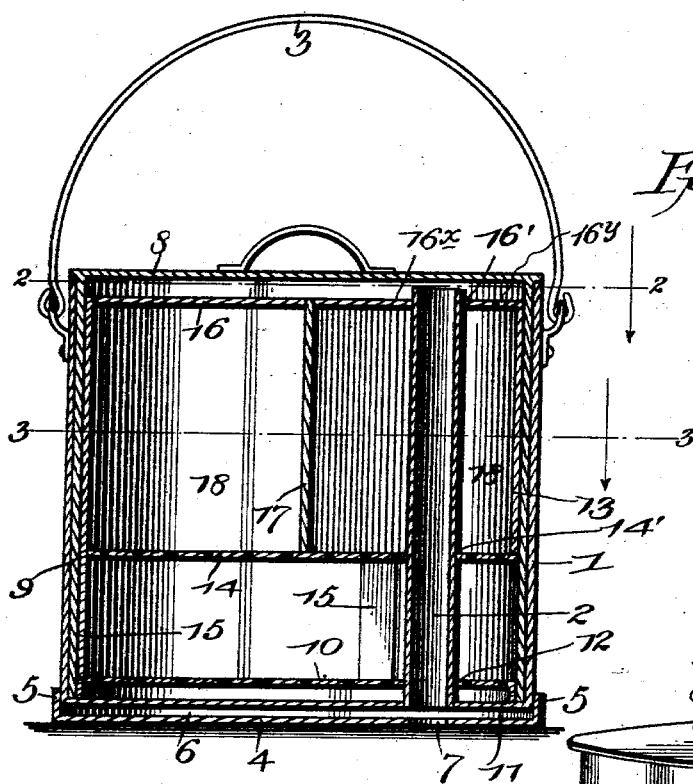

No. 629,320. Patented July 18, 1899.
C. BALL.
STEAM COOKER.
(Application filed Feb. 24, 1899.)

(No Model.) 2 Sheets—Sheet 1.

Cortland Ball, Inventor.

No. 629,320. Patented July 18, 1899.
C. BALL.
STEAM COOKER.
(Application filed Feb. 24, 1899.)

(No Model.) 2 Sheets—Sheet 2.

Witnesses
Cortland Ball, Inventor

UNITED STATES PATENT OFFICE.

CORTLAND BALL, OF INDIANAPOLIS, INDIANA, ASSIGNOR OF ONE-HALF TO WILLIAM D. LEWIS, OF SAME PLACE.

STEAM-COOKER.

SPECIFICATION forming part of Letters Patent No. 629,320, dated July 18, 1899.

Application filed February 24, 1899. Serial No. 706,668. (No model.)

*To all whom it may concern:*

Be it known that I, CORTLAND BALL, a citizen of the United States, residing at Indianapolis, in the county of Marion and State of Indiana, have invented certain new and useful Improvements in Steam-Cookers; and I do declare the following to be a full, clear, and exact description of the invention, such as will enable others skilled in the art to which it appertains to make and use the same.

My invention relates to improvements in steam-cookers, and more particularly to that class in which several articles of food of a different nature may be prepared at the same time—as, for instance, meat and vegetables or puddings and the like—without any of the articles imparting its odor to the others; and the object is to simplify and improve the construction and increase the efficiency and usefulness of the device.

A further object is to free the house from steam and objectionable kitchen odors. I attain this object by means of an escape-flue, whereby the same will pass into the fire-box, where it will be consumed by the fire.

To these ends the invention consists in the construction, combination, and arrangement of the several elements of the device, as will be hereinafter more fully described, and particularly pointed out in the claim.

In the accompanying drawings the same reference characters indicate the same parts of the invention.

Figure 2:
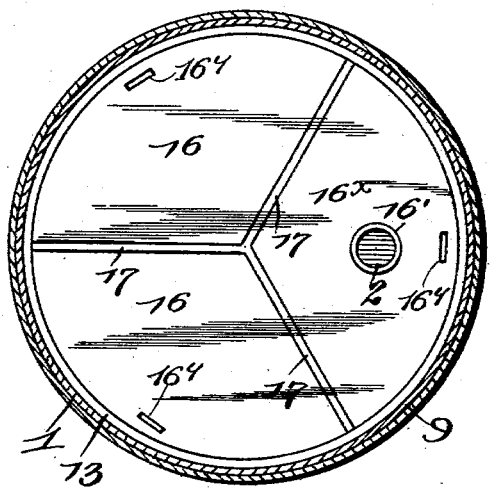
Figure 3:
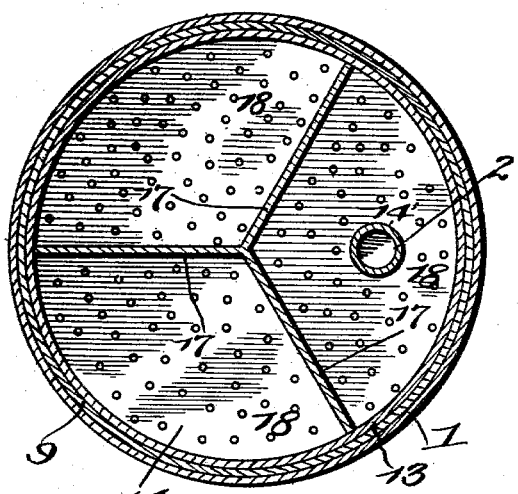
Figure 5:
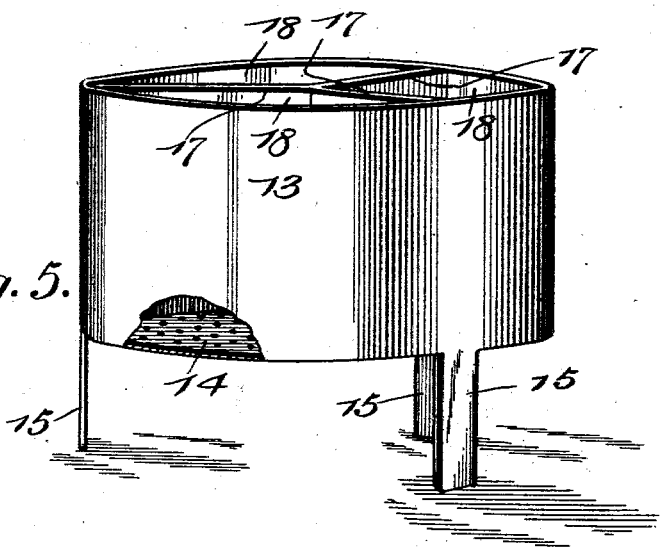

Figure 1 is a vertical section of my improved steam food-cooker. Fig. 2 is a section on line 2 2. Fig. 3 is a horizontal section on the line 3 3 of Fig. 1. Fig. 4 is a perspective view of the cover detached. Fig. 5 is a perspective view, partly in section, of the food-chamber detached with covers removed. Fig. 6 is a detail perspective view of the false bottom of the cooker.

1 denotes a cylindrical sheet-metal vessel provided with a vertical flue 2 and having the usual hinged bail-handle 3, and 4 denotes a bottom guard removably secured to the outside of the vessel by an encompassing flange 5, so as to form a horizontal air-space 6 between the guard and the bottom of the vessel, as shown, and it is provided with an orifice 7, which is alined with the vertical flue in the vessel 1.

8 denotes the removable cover, provided with a grip-handle, as shown, and its continuous flange 9 extends downward inside of the vessel and rests upon the bottom thereof.

10 denotes a foraminous false bottom having a circumferential flange 11, which rests upon the bottom of the vessel 1 inside of the cover-flange 9, and it is provided with an orifice 12 to receive the vertical flue 2.

13 denotes the cylindrical food-receptacle, formed with a foraminous bottom 14 and legs 15 15 15, which support it at the proper position in the vessel 1. 16 16 $16^x$ denote its removable covers, and the cover $16^x$ and foraminous bottom are provided with alined orifices 16' 14', through which the vertical flue 2 extends. Each of these covers is provided with a slot $16^y$, which allows the heated gases to escape from the corresponding receptacle, and these slots may also be employed to receive an ordinary lifter to manipulate the covers with.

The food-receptacle is provided with three radial partitions 17 17 17, which divide it into three separate or independent food-chambers 18 18 18 and in which the food to be cooked is placed.

It is to be understood that the food-receptacle may be made with one or more food-chambers. I have shown three, because I consider that number the most desirable.

In operation a suitable quantity of water is placed in the vessel 1 and the food placed in the food-chambers. It is to be understood that one of the lids of the stove is to be removed and the cooker placed on the hole in such a position that the exit end of the flue will be so that the steam and odor which escape from the covered food-chambers will pass unobstructed into the stove.

In boiling an article larger than could be contained in one of the food-chambers or when it is desired to boil several articles the receptacle 13 is removed and the articles placed upon the false bottom 10, which prevents the food from sticking to the bottom of the vessel 1.

The accompanying drawings show my invention in the best form now known to me; but many changes in the details might be made within the skill of a good mechanic without departing from the spirit of my invention as set forth in the claim at the end of this specification.

Having thus fully described my invention, what I claim, and desire to secure by Letters Patent of the United States, is—

In a culinary utensil of the class described, the sheet-metal vessel 1, the vertical flue 2 fixed in the bottom thereof, the bottom guard 4 formed with an orifice 7, the removable cover, and the cylindrical food-receptacle formed with separate compartments, one of which is provided with orifices to permit the passage of said flue, substantially as and for the purpose set forth.

In testimony whereof I have hereunto set my hand in presence of two subscribing witnesses.

CORTLAND BALL.

Witnesses:
 FRANK A. JACOB,
 WM. L. LIGHTFORD.